R. VOSE.

Car Spring.

No. 1,421. Reissued Feb 24, 1863.

Witnesses:

Gilbert B. Fowles

Randolph Coyle Jr

Inventor:

Richard Vose

By Robbins & Burr his attorneys

AM. PHOTO-LITHO. CO. N.Y. (OSBORNE'S PROCESS.)

UNITED STATES PATENT OFFICE.

RICHARD VOSE, OF NEW YORK, N. Y.

IMPROVEMENT IN CAR-SPRINGS.

Specification forming part of Letters Patent No. 34,657, dated March 11, 1862; Reissue No. 1,421, dated February 24, 1863.

DIVISION B.

*To all whom it may concern:*

Be it known that I, RICHARD VOSE, of the city, county, and State of New York, have invented a new and Improved Helical Spring; and I do hereby declare that the following is a full, and exact description thereof, reference being had to the accompanying drawings, which form a part of this specification—

Figure 6:
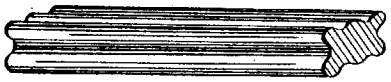
Figure 2:
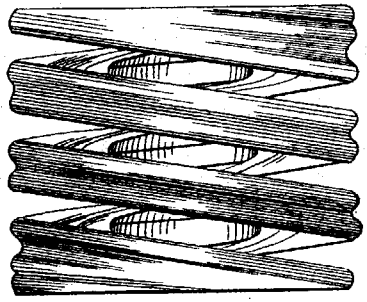

Figures 1 and 2 being side elevations of my improved spring; Figs. 4 and 6, side views of fluted metallic bars used in the manufacture of my said springs; and Figs. 3 and 7, transverse sections of these bars, showing the arrangement of the grooves thereupon.

The nature of my invention consists in the use of longitudinally grooved, channeled, twisted, or otherwise irregularly-shaped metallic bars in the manufacture of spiral or helical springs, for the purpose of obtaining thereby springs of much greater stength, toughness, elasticity, and durability with a given weight of metal than has ever before been produced, said longitudinally-corrugated springs to be used either with a packing of rubber or other elastic substance, as described in my separate specification bearing even date herewith, or otherwise, as circumstances shall require.

Figure 7:
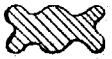

It is well known to artificers in metal that the purity, refinement, and toughness of steel, as of other metals, are increased greatly in proportion to the thinness to which it is worked, and that the greater the surface of the metal the more reliable its strength and elasticity; hence in manufacturing my improved springs I cause the bars of steel or other metal to be grooved, indented, or fluted (as represented in Figs. 3, 6, and 7) or otherwise irregularly shaped previous to their being coiled into the helical or spiral shape required in the spring. By this means I secure the exposure of the greatest possible surface of metal in tempering the spring, and thereby obtain more perfect uniformity in its temper and quality.

After repeated experiments I have found that by thus extending and increasing the metallic surface of the coil-bars not only does their temper and texture become greatly improved, but that the helical springs thus peculiarly formed acquire singular elasticity, toughness, and durability, and are far more reliable in all situations where they are subjected to constant strain than those constructed in the ordinary mode.

What I claim as my invention, and desire to secure by Letters Patent, is—

The use of longitudinally indented, grooved, or channeled metallic rods or bars, when formed into spiral or helical springs of substantially the shape herein represented and described.

The above specification of my improvement in railroad-car springs signed and witnessed this 20th day of January, A. D. 1863.

RICHARD VOSE.

Witnesses:

CHARLES D. GIBSON,

A. L. BUTLER.